(12) United States Patent
Gupta et al.

(10) Patent No.: US 10,963,125 B2
(45) Date of Patent: Mar. 30, 2021

(54) VISUALIZATION TOOL FOR INTERACTING WITH A QUANTUM COMPUTING PROGRAM

(71) Applicant: Microsoft Technology Licensing, LLC, Redmond, WA (US)

(72) Inventors: Rajeev Gupta, Hyderabad (IN); Venkata Pavan Kumar Kesamreddy, Hyderabad (IN); Reena Dayal Yadav, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 16/355,937

(22) Filed: Mar. 18, 2019

(65) Prior Publication Data
US 2020/0301562 A1 Sep. 24, 2020

(51) Int. Cl.
| | |
|---|---|
| *G06F 3/0481* | (2013.01) |
| *G06N 10/00* | (2019.01) |
| *G06F 3/01* | (2006.01) |
| *G06F 3/16* | (2006.01) |
| *G06F 9/455* | (2018.01) |
| *G06T 11/20* | (2006.01) |
| *G06T 15/00* | (2011.01) |

(52) U.S. Cl.
CPC .......... *G06F 3/04815* (2013.01); *G06F 3/013* (2013.01); *G06F 3/017* (2013.01); *G06F 3/167* (2013.01); *G06F 9/455* (2013.01); *G06N 10/00* (2019.01); *G06T 11/206* (2013.01); *G06T 15/005* (2013.01); *G06T 2200/24* (2013.01)

(58) Field of Classification Search
CPC ...... G06F 3/04815; G06F 3/013; G06F 3/017; G06F 3/167; G06F 9/455; G06N 10/00; G06T 11/206; G06T 15/005
See application file for complete search history.

(56) References Cited

U.S. PATENT DOCUMENTS

| | | | | |
|---|---|---|---|---|
| 10,592,626 | B1 * | 3/2020 | Pednault | G06N 10/00 |
| 2014/0375789 | A1 | 12/2014 | Lou et al. | |
| 2019/0051058 | A1 * | 2/2019 | Robinson | G06T 19/20 |

OTHER PUBLICATIONS

PCT Search Report and Written Opinion for PCT Application No. PCT/US2020/016304, dated May 26, 2020, 19 pages.

(Continued)

*Primary Examiner* — Angie Badawi

(57) ABSTRACT

A technique is described herein for assisting a user in exploring the operation of a quantum computer program. It involves first receiving qubit state information from a quantum system emulator which executes a quantum computer program. The qubit state information describes one or more states of one or more respective qubits at a specified analysis point in the quantum computer program. The technique then generates a three-dimensional graphical depiction that provides a visualization of the qubit state information. The three-dimensional graphical depiction includes at least one graphical control element that allows a user to interact with the three-dimensional graphical depiction. The technique then displays the three-dimensional graphical depiction on a display device. In one implementation, the display device is provided by a head mounted display associated with a mixed reality system.

20 Claims, 8 Drawing Sheets

(56) References Cited

OTHER PUBLICATIONS

Patrzyk, et al., "Towards a Novel Environment for Simulation of Quantum Computing," in Computer Science, 16(1), 2015, pp. 103-129.

Gidney, Craig, "My Quantum Circuit Simulator: Quirk," available at https://algassert.com/2016/05/22/quirk.html, Algorithmic Assertions, posted publication date of May 26, 2016, accessed on Jul. 17, 2020, 8 pages.

Shary, et al., "Bloch Sphere Simulation," available at https://eecs.ceas.uc.edu/~cahaymm/blochsphere/, University of Cincinnati, posted publication date of Jan. 12, 2012, accessed on Jul. 17, 2020, 1 page.

"Qubit," available at <<https://en.wikipedia.org/wiki/Qubit>>, Wikipedia article, accessed on Feb. 26, 2018, 8 pages.

"Quantum logic gate," available at <<https://en.wikipedia.org/wiki/Quantum_logic_gate>>, Wikipedia article, accessed onn Feb. 26, 2018, 10 pages.

"Testing and Debugging," available at <<https://docs.microsoft.com/en-us/quantum/techniques/testing-and-debugging?view=qsharp-preview&tabs=tabid-vs2017>>, Quantum Development Kit, Microsoft Corporation, Redmond, WA, Dec. 10, 2017, 10 pages.

"The Weird and Wonderful World of the Qubit," available at <<https://quantumexperience.ng.bluemix.net/proxy/tutorial/beginners-guide/004-The_Weird_and_Wonderful_World_of_the_Qubit/001-The_Weird_and_Wonderful_World_of_the_Qubit.html>>, IMB Q Experience Documentation, International Business Machines Corporation (IBM), Armonk, NY, accessed on Feb. 26, 2018, 2 pages.

"Histogram representation (Bar graph)," available at <<https://quantumexperience.ng.bluemix.net/qx/tutorial?sectionId=beginners-guide&page=003-Getting_Started~2F002-Histogram_representation_(Bar_graph)>>, IMB Q Experience Documentation, International Business Machines Corporation (IBM), Armonk, NY, accessed on Feb. 26, 3 pages.

Durrant-Whyte, et al., "Simultaneous Localization and Mapping: Part I," in IEEE Robotics & Automation Magazine, vol. 13, No. 2, Jun. 2006, pp. 99-108.

Bailey, et al., "Simultaneous Localization and Mapping (SLAM): Part II," in IEEE Robotics & Automation Magazine, vol. 13, No. 3, Sep. 2006, pp. 108-117.

Solenov, et al., "Evaluation of Decoherence for Quantum Computing Architectures: Qubit System Subject to Time-Dependent Control," arXiv:cond-mat/0506286v2 [cond-mat.mes-hall], Nov. 2005, 25 pages.

Fedorov, et al., "Evaluation of Decoherence for Quantum Control and Computing," arXiv:cond-mat/0401248v2 [cond-mat.mes-hall], Jul. 2004, 26 pages.

Obenland, et al., "Simulating the Effect of Decoherence and Inaccuracies on a Quantum Computer," arXiv:quant-ph/9804038v1, Apr. 1998, 12 pages.

\* cited by examiner

CREATING A THREE-DIMENSIONAL DEPICTION
502

RECEIVE QUBIT STATE INFORMATION FROM A QUANTUM SYSTEM EMULATOR, THE QUANTUM SYSTEM EMULATOR EXECUTING A QUANTUM COMPUTER PROGRAM, AND THE QUBIT STATE INFORMATION DESCRIBING ONE OR MORE STATES OF ONE OR MORE RESPECTIVE QUBITS AT A SPECIFIED ANALYSIS POINT IN THE QUANTUM COMPUTER PROGRAM.
504

GENERATE A THREE-DIMENSIONAL GRAPHICAL DEPICTION THAT PROVIDES A VISUALIZATION OF THE QUBIT STATE INFORMATION, THE THREE-DIMENSIONAL GRAPHICAL DEPICTION INCLUDING AT LEAST ONE GRAPHICAL CONTROL ELEMENT THAT ALLOWS A USER TO INTERACT WITH THE THREE-DIMENSIONAL GRAPHICAL DEPICTION.
506

DISPLAY THE THREE-DIMENSIONAL GRAPHICAL DEPICTION ON A DISPLAY DEVICE.
508

VISUALIZATION TOOL FOR INTERACTING WITH A QUANTUM COMPUTING PROGRAM

BACKGROUND

A computer programmer typically subjects a conventional computer program to robust testing prior to its release. In some cases, the programmer tests the computer program by methodically changing the values of its runtime variables, and then noting how the computer program responds to these changes. This iterative testing procedure provides insight into whether the computer program is operating in a desired manner.

The field of quantum computing has various characteristics which complicate testing, as it has traditionally been performed. For example, using Dirac's notation, a qubit at a particular point in the execution of a quantum computer program has a state $|\psi\rangle$ that may be expressed as a weighted superposition of two basis states, 0 and 1. That is, $|\psi\rangle = \alpha|0\rangle + \beta|1\rangle$, wherein $\alpha$ and $\beta$ are probability amplitudes, such that $|\alpha|^2 + |\beta|^2 = 1$. This superposition collapses into the "classical" bits of 0 and 1, however, whenever the qubit state is physically measured. To further complicate issues, the state of a qubit may be entangled with the states of other qubits at a particular juncture in the quantum computer program. Two or more qubits are said to be entangled when their composite n-qubit state cannot be expressed as a tensor product of their constituent individual qubit states. These complicating factors may prevent a programmer from understanding what is happening at a particular juncture of a quantum computer program. These factors may also make it more difficult for the programmer to explore the operation of the quantum computer program by methodically making changes to it. A programmer may even attempt to modify a qubit state in a prohibited manner, e.g., by attempting to change the state of a qubit without considering its entanglement with another qubit.

SUMMARY

A technique is described herein for assisting a user in exploring the operation of a quantum computer program, e.g., for testing the program or for any other purpose. It involves first receiving qubit state information from a quantum system emulator which executes the quantum computer program. The qubit state information describes one or more states of one or more respective qubits at a specified analysis point in the quantum computer program. The technique then generates a three-dimensional graphical depiction that provides a visualization of the qubit state information. The three-dimensional graphical depiction includes at least one graphical control element that allows a user to interact with the three-dimensional graphical depiction. The technique then displays the three-dimensional graphical depiction on a display device.

In one implementation, the display device is provided by a head mounted display associated with a mixed reality system.

In one case, the three-dimensional graphical depiction provides a three-dimensional representation of a Bloch sphere for a single qubit.

In another case, the three-dimensional graphical depiction provides plural three-dimensional representations of plural respective Bloch spheres, associated with plural respective qubits that are not entangled.

In still another case, the three-dimensional graphical depiction provides a three-dimensional representation of a bar chart. The bar chart conveys information regarding the absolute values and phases of probability amplitudes associated with an n-qubit state. As will be described and illustrated, the bar chart conveys this information using the lengths of bar portions in the bar chart (for absolute values), and the direction of these bar portions (for phases). This type of depiction is appropriate for a set of qubits regardless of whether or not the qubits are entangled.

According to another illustrative aspect, the technique allows a user to interact with the three-dimensional depiction via the graphical control element(s). For example, the user may apply any quantum gate to a qubit under consideration by interacting with a graphical control element associated with the quantum gate. In another case, a Bloch sphere itself may be associated with a graphical control element; here, the user may directly interact with the Bloch sphere, e.g., by changing the angle(s) which define the current state of the qubit.

Overall, the technique assists a user in understanding the states of runtime variables in the execution of a quantum computer program. The technique also provides a convenient mechanism for changing these variables. The technique therefore improves the ability of the user to methodically test the quantum computer program.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flowchart that shows one process by which the visualization tool of FIG. 1 can display a three-dimensional depiction.

Figure 1:
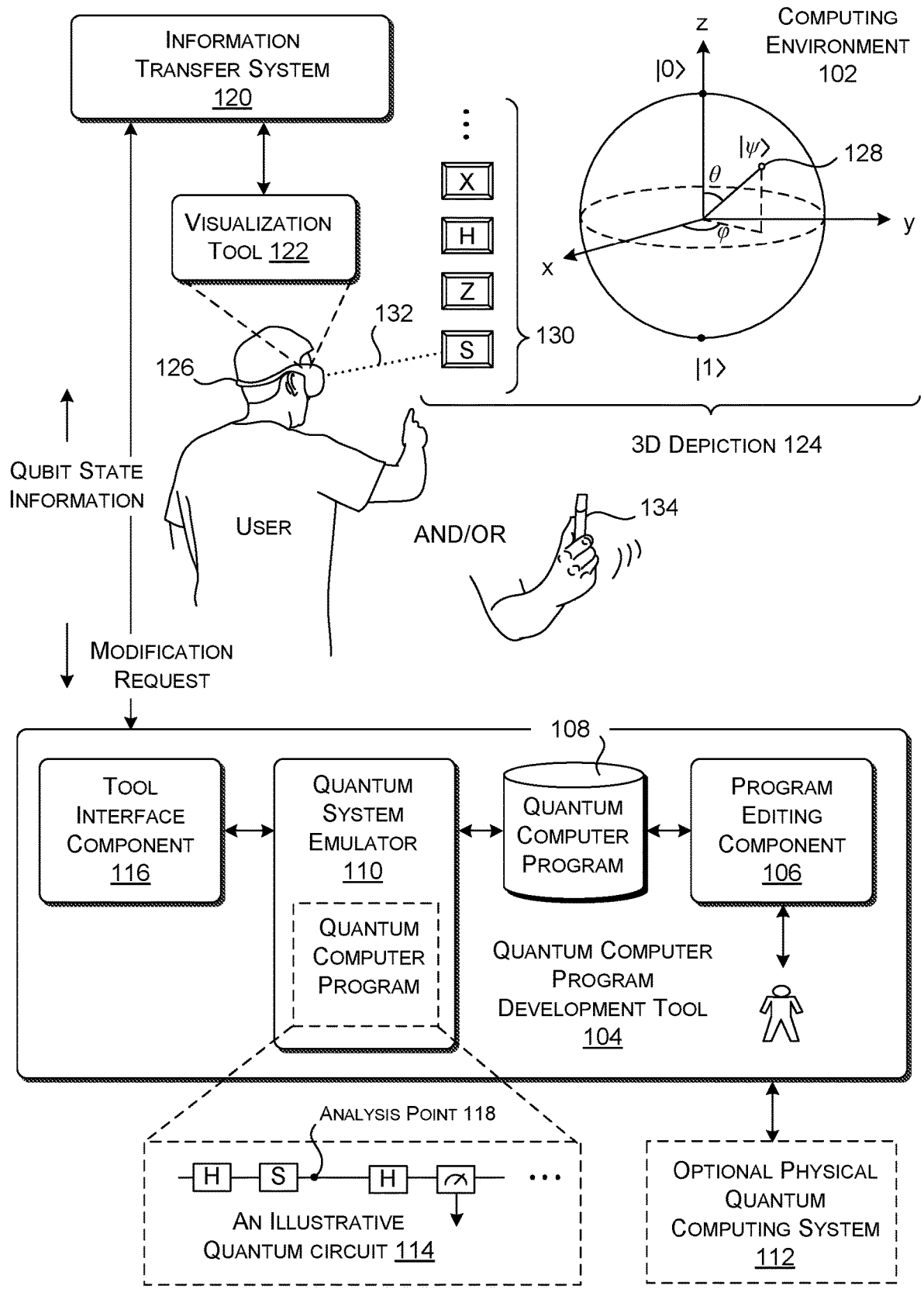
FIG. 1 shows an illustrative computing environment that allows a user to develop and test quantum computer programs. It further includes a visualization tool that allows a user to visualize the state of a quantum computer program at a specified analysis point.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for testing a quantum computer program. Section B sets forth illustrative methods which explain the operation of the computing environment of Section A. Section C describes an illustrative head mounted display that can be used in the computing environment of Section A. And Section D describes illustrative computing functionality that can be used to implement any processing-related aspect of the features described in Sections A, B, and C.

As a preliminary matter, the term "hardware logic circuitry" corresponds, at least in part, to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section D provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section D, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section D. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section D. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 that allows a user to develop and test quantum computer programs. The computing environment includes a quantum program development tool ("development tool") 104 for developing a quantum computer program to be tested. A quantum computer program includes a series of gates applied to one or more qubits. A qubit, in turn, represents the quantum counterpart to a bit. As noted above, the state $|\psi\rangle$ of a qubit corresponds to a weighted combination of the qubit basis states $|0\rangle$ and $|1\rangle$, given by the formula. $|\psi\rangle = \alpha|0\rangle + \beta|1\rangle$, subject to the constraint that $|\alpha|^2 + |\beta|^2 = 1$. The symbols $\alpha$ and $\beta$ represent complex amplitudes of the qubit. That is, each of $\alpha$ and $\beta$ may correspond to a complex number.

The development tool 104 includes a program editing component 106 for creating the program statements which compose a quantum computer program, and a data store 108 for storing the quantum computer program. A quantum system emulator ("emulator") 110 emulates the execution of the quantum computer program. It does this by duplicating the results that would be achieved by running the quantum computer program on a physical quantum computing system 112. In doing so, the emulator 110 simulates various quantum effects, such as the superposition of basis states and entanglement. In contrast, the actual quantum computer system 112 includes hardware which physically produces these effects, e.g., using superconducting quantum circuits which exhibit the Josephson effect.

Without limitation, one such tool for creating, editing, and emulating quantum computer programs is VISUAL STUDIO produced by MICROSOFT CORPORATION of Redmond, Wash. In that technical framework, a programmer may write a quantum computer program in the Q# computer language. Any type of computing device can implement the development tool 104, such as a desktop computing device, etc.

In practice, a user typically builds a quantum circuit by specifying a series of quantum gates to be applied to one or more qubits. Each gate performs any type of transformation on one or more qubits, to produce an output result. A single-qubit gate (such as the Hadamard (H) gate) operates on a single qubit. A multi-qubit gate (such as the conditional NOT (CNOT) gate) operates on two or more qubits. A user may also add a measurement operator at one or more junctures of a quantum circuit. During execution, a measurement operator provides an output value to an output register. This measurement operation collapses a state (which represented a superposition of two or more basis states) into a "classical" digital value, e.g., in the case of a single qubit, either 0 or 1. FIG. 1 shows a portion of a merely illustrative quantum circuit 114 that includes a series of quantum gates that operate on a single qubit, followed by a measurement operator.

A tool interface component 116 captures quantum state information associated with a specified point of analysis in the execution of a quantum computer program. For instance, assume that a quantum circuit uses two qubits to provide the composite basis qubit states of $|00\rangle$, $|01\rangle$, $|10\rangle$, and $|11\rangle$. Further assume that, at a particular analysis point, the state of the quantum circuit is:

$$|\psi\rangle = \frac{1}{\sqrt{2}}|00\rangle - \frac{(1+i)}{2}|10\rangle.$$

The tool interface component 116 produces a data structure for this state that lists the probability amplitude of each basis state that contributes to this state (e.g., $|00\rangle$, $|01\rangle$, $|10\rangle$, and $|11\rangle$), providing both the real and imagination components of each probability amplitude:

| ID of Wave Function | Real Component | Imaginary Component |
|---|---|---|
| 0: ($|00\rangle$) | 0.707 | 0.0 |
| 1: ($|01\rangle$) | 0.0 | 0.0 |
| 2: ($|10\rangle$) | −0.5 | −0.5 |
| 3: ($|11\rangle$) | 0.0 | 0.0 |

In practice, a user may be interested in probing the state at an analysis point following a gate of a quantum circuit, such as at an analysis point 118 in the illustrative quantum circuit 114. Alternatively, the tool interface component 116 can capture state information at a plurality of analysis points of a quantum circuit. In one implementation, the tool interface component 116 can capture the quantum state information in the above-described manner using the DumpMachine or DumpRegister functions provided by VISUAL STUDIO.

An information transfer system 120 stores the quantum state information from the tool interface component 116. The information transfer system 120 then supplies the quantum state information to a visualization tool 122. In one implementation, the information transfer system 120 represents one or more computing devices and associated data store(s) provided at a network-accessible site (e.g., at a cloud storage site). The information transfer system 120 can receive the quantum state information using a push-based approach (in which the tool interface component 116 independently forwards the quantum state information to the information transfer system 120), or a pull-based approach (in which the tool interface component 116 forwards the quantum state information to the information transfer system 120 upon request by the information transfer system 120). Similarly, the visualization tool 122 can receive the quantum state information from the information transfer system 120 using a push-based approach or a pull-based approach. In yet another case, the visualization tool 122 may directly interact with the tool interface component 116 without the service provided by the information transfer system 120.

The visualization tool 122 presents a three-dimensional graphical depiction 124 of the quantum state information. In the non-limiting example of FIG. 1, assume that the visualization tool 122 is a component of a head mounted display (HMD) 126. Alternatively, the visualization tool 122 corresponds to a computing device (or devices) of any kind which forwards digital information that describes the three-dimensional depiction 124 to the HMD 126, whereupon the HMD 126 displays the three-dimensional depiction 124 to the user.

The HMD 126 provides a mixed reality experience to a user who uses the HMD 126. As the term is used herein, a mixed reality experience refers to the presentation of a scene that includes at least some virtual content. In one case, the HMD 126 provides a mixed reality experience by providing a completely-immersive virtual world. In another case, the HMD 126 provides a mixed reality experience by superimposing virtual content on a representation of real content in the user's physical environment. The HMD 126 can achieve the latter augmented reality implementation by displaying virtual content on a see-through display device, or combining the virtual content with a computer-generated reconstruction of the real environment, etc. Section C provides additional illustrative detail regarding one implementation of the HMD 126.

In another case, the visualization tool 122 corresponds to any type of computing device which provides the three-dimensional depiction 124 on a two-dimensional display monitor (not shown in FIG. 1). In that case, the visualization tool 122 achieves a three-dimensional effect using any n-point perspective techniques, foreshortening techniques, etc. In another case, the visualization tool corresponds to a computing device that provides a hologram representation of the three-dimensional depiction 124. But to facilitate explanation, the Detailed Description will mainly describe the visualization tool 122 in the context of the above-noted HMD-related implementation.

In the example of FIG. 1, assume that the user is interested in exploring state information associated with a single qubit, e.g., associated with the analysis point 118 of the quantum circuit 114 described above. Further assume that that single qubit is not entangled with the state of any other qubit. Two qubits are said to be entangled when their two-qubit composite state cannot be expressed as a tensor product of their individual single-qubit states. In that circumstance, the visualization tool 122 may render the state information in the form of a Bloch sphere.

A Bloch sphere corresponds to a 2-sphere having two poles. A topmost pole represents the basis vector $|0\rangle$, while the bottommost pole represents the basis vector $|1\rangle$. Every other point on the surface represents a superposition of these two basis vectors, determined by the probability amplitudes $\alpha$ and $\beta$. The visualization tool 122 displays a graphical marker 128 of any type which represents the current state $|\psi\rangle$ of the analysis point under consideration.

More formally stated, a line connecting the origin of the Bloch sphere to the current state $|\psi\rangle$ makes an angle $\theta$ with the z axis. The projection of that line onto the x-y plane makes an angle $\varphi$ with the x axis. Ignoring the component $e^{i\psi}$ (which has no observable impact), the probability amplitudes $\alpha$ and $\beta$ relate to $\theta$ and $\varphi$ as follows:

$$\alpha = \cos\frac{\theta}{2}, \text{ and } \beta = e^{i\varphi}\sin\frac{\theta}{2}.$$

The three-dimensional depiction also includes a set of graphical control elements 130 associated with single-qubit gates that can be applied to the qubit in its current state, to yield an output result. For example, a Pauli X gate, Pauli Y gate, and Pauli Z gate modify the current state by the following three operators:

$$X \text{ operator: } \begin{bmatrix} 0 & 1 \\ 1 & 0 \end{bmatrix},$$

$$Y \text{ operator: } \begin{bmatrix} 0 & -i \\ i & 0 \end{bmatrix}, \text{ and}$$

$$Z \text{ operator: } \begin{bmatrix} 1 & 0 \\ 0 & -1 \end{bmatrix}.$$

These operators also have the effect of rotating of current state about the x axis, y axis, and z axis, respectively. The H gate, also known as the Hadamard operator, is given by:

$$H \text{ operator: } \frac{1}{\sqrt{2}}\begin{bmatrix} 1 & 1 \\ 1 & -1 \end{bmatrix}.$$

The graphical control elements 130 may represent yet other gates; the above-identified gates are described in the spirit of illustration, not limitation. Further, at least one graphical control element may represent a combination of two or more elemental gates. Finally, although not shown in FIG. 1, the Bloch sphere itself is associated with a graphical control element (e.g., a graphical control field) which allows the user to manipulate the Bloch sphere itself, e.g., by changing the position of the graphical marker 128.

As will be described in greater detail in the context of FIG. 2, the visualization tool 122 includes a command-detecting engine which detects the user's interaction with the graphical control element(s) of the three-dimensional depiction 124. In operation, the command-detecting engine receives input information from one or more input devices. Based on the input information, the command-detecting engine determines whether the user has performed a telltale command. As will be described below, the command-detection engine can make this determination by comparing a pattern of input information associated with the user's action with reference patterns associated with known gestures, known voice commands, etc. It determines that the user has performed a known gesture or known voice command if the input information matches one of the reference patterns with a prescribed degree of confidence.

In one non-limiting implementation, the user can make a first telltale hand gesture to instruct the command-detecting engine to increase the angle φ, e.g., by moving his hand from left to right. The user can make a second telltale hand gesture to decrease the angle φ, e.g., by moving his hand from right to left. The user can make a third telltale hand gesture to increase the angle θ, e.g., by moving his hand in the downward direction. The user can make a fourth telltale hand gesture to decrease the angle θ, e.g., by moving his hand in the upward direction. The user may activate a gate by gazing at its associated graphical control element and executing an air tap gesture. In the example of FIG. 1, for instance, the user is presumed to be gazing at an "S" quantum gate, as represented in the figure by a dotted line 132.

In other scenarios, the three-dimensional depiction 124 is presented on a two-dimensional display of any type. Here, the user can interact with the graphical control element(s) of the three-dimensional depiction 124 using any type(s) of input device(s), such as a key input device, a mouse input device, a game controller-type input device, a touch-sensitive surface input device, and so on. For example, the user can change the position of a quantum state on a Bloch sphere by moving a cursor over the graphical marker 128 associated with the current state, and then dragging the graphical marker 128 to a new position on the Bloch sphere (e.g., by clicking on the graphical marker 128 with a mouse key button, and then dragging on the graphical marker 128 with the mouse button in its down state). Or the user can change the position of the graphical marker 128 by touching it on a touch-sensitive display surface and dragging his or her finger to a new position on the surface of the Bloch sphere. A user can activate any of the graphical controls 130 in a similar manner, e.g., by using a mouse device to click on a desired gate icon, or tapping on a desired gate icon with a finger on a touch-sensitive display surface, etc.

Alternatively, or in addition, the user can interact with the graphical control element(s) of the three-dimensional depiction 124 using a handle controller 134. The controller 134 can communicate with the HMD 126 via infrared signals, magnetic signals, etc. Or the controller 134 may be tethered to the HMD 126 via a physical communication cable. For example, the user can activate a gate by pointing to its associated graphical control element with the handheld controller 134, or gazing at it, and then activating a physical control element (e.g., a physical button) on the handheld controller 134. Similarly, the user can change an angle of the Bloch sphere by gazing at a graphical control element associated with the angle (not shown in FIG. 1), and then clicking "increase" and "decrease" physical buttons on the handheld controller 134.

Alternatively, or in addition, the user can interact with the graphical control element(s) of the three-dimensional depiction 124 by issuing voice commands. For example, the user can activate a gate by gazing its associated graphical control element, and then uttering the command, "select gate," etc. The user can change an angle of the Bloch sphere by gazing at a graphical control element associated with the angle (not shown), and then issuing the command "increase" or the command "decrease," etc.

Upon recognition of the user's command, the visualization tool 122 carries out the command by sending a modification request to the tool interface component 116 of the development tool 104 via the information transfer system 120, e.g., by making an Application Programming Interface (API) call. Alternatively, the visualization tool 122 can directly send the modification request to the tool interface component 116. Upon receipt, the emulator 110 modifies the qubit state at the analysis point 118, e.g., by applying a selected gate. The programmer can then take note of the "downstream" effect that this change has on the program, with respect to one or more measurement points.

The user may repeat the above-described operations to perform any environment-specific testing regimen. For instance, the user may successively change the state of a qubit, each time observing the consequence of this change. The user may also repeat this same process for different analysis points.

By way of clarification, note that, while the emulator 110 may change the state of a qubit, it does not modify the quantum computer program itself. In other words, assume that the user selects a particular quantum gate. The emulator 110 uses that gate to transform the qubit at the analysis point under consideration, but does not take the formal step of adding the new gate to the quantum computer program. The programmer himself or herself may choose to manually edit the quantum computer program in this manner by interacting with the program editing component 106.

Overall, the computing environment 102 helps a user to quickly understand the states of one or more qubits at a particular analysis point in a quantum computer program. It also provides a mechanism for allowing a user to conveniently change the states of the qubit(s). It also prevents the user from making unauthorized changes to a qubit. For example, the computing environment 102 will not give the user the opportunity to change an entangled qubit using the kind of three-dimensional depiction 124 shown in FIG. 1.

As a final comment regarding FIG. 1, in the above-described manner of operation, the user performs his or her testing entirely on the development tool 104, not on a physical quantum computing system 112. In another scenario, a user can run the same quantum computing program on the emulator 110 and on the physical quantum computing system 112. In that case, the emulator 110 mirrors all actions (including testing operations) that the physical quantum computer system 112 performs. The three-dimensional depiction 124 will thereby provide insight into the execution of the quantum computing program being run by both the emulator 110 and, indirectly, the physical computing system 112.

Figure 2:
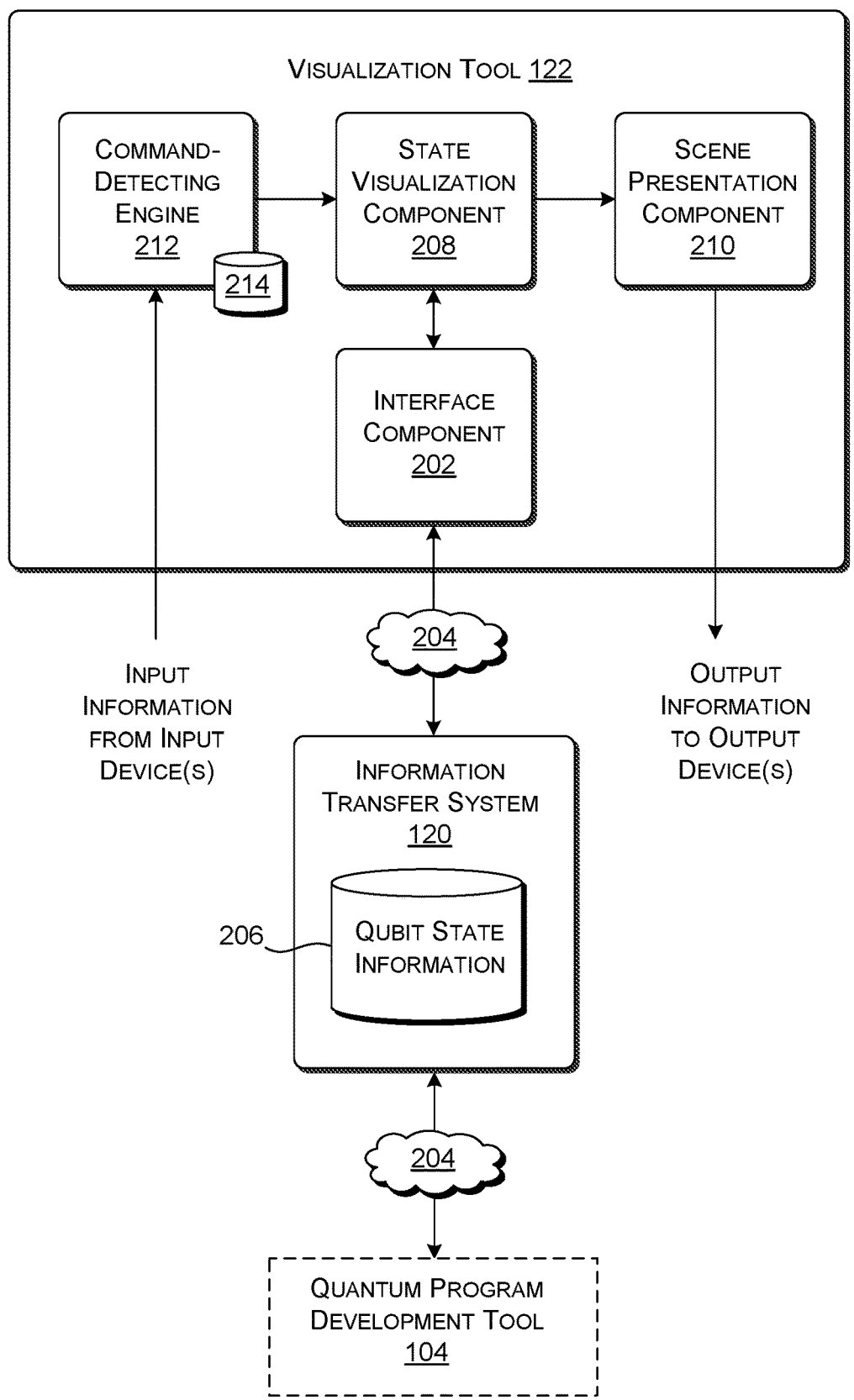
FIG. 2 shows additional illustrative details regarding the visualization tool of FIG. 1.

Advancing to FIG. 2, this FIG. 2 shows additional details regarding the visualization tool 122. The visualization tool 122 includes an interface component 202 for receiving state information from the information transfer system 120, and for sending modification requests to the information transfer system 120. In the non-limiting implementation in which the information transfer system 120 is a cloud-enabled service, the interface component 202 interacts with the information transfer system 120 via a computer network 204 (e.g., the Internet). The information transfer system 120 itself includes a data store 206 for storing the qubit state information that it receives from the development tool 104. The information transfer service 120 can interact with the tool interface component 116 of the development 104 via the same computer network 204, or a different computer network. In one implementation, the information transfer service 120 can implement an API that allows the tool interface component 116 and the visualization tool 122 to store and retrieve information in/from the data store 206.

A state visualization component 208 generates the three-dimensional depiction 124 based on the qubit state information fed to it from the development tool 104. To perform this function, the state visualization component 208 first determines what kind of three-dimensional depiction 124 to present to the user. It makes this decision, in turn, based on the type of depiction requested by the user, together with a determination of whether it is possible to generate that depiction. For example, the state visualization component 208 may preclude the user from displaying a Bloch sphere presentation for a qubit that is entangled with another qubit. This is because the user is not free to change these entangled qubits in an independent manner (although, as discussed below, the user may apply one or more gates to entangled qubits). Instead, the state visualization component 208 can display state information for these entangled qubits using the visual representation shown in FIG. 4 (to be described below). Upon selection of a valid three-dimensional depiction, the state visualization component 208 then draws it. For the case of a Bloch sphere, the state visualization component 208 computes the angles $\theta$ and $\varphi$ and then displays a graphical marker 128 at a location on a sphere that is determined by these angles.

In one implementation, a scene presentation component 210 can use graphics pipeline technology to produce a three-dimensional (or two-dimensional) representation of a mixed reality environment. The graphics pipeline technology can perform processing that includes vertex processing, texture processing, object clipping processing, lighting processing, rasterization, etc. Overall, the graphics pipeline technology can represent surfaces in a scene using meshes of connected triangles or other geometric primitives. The scene presentation component 210 can also produce images for presentation to the left and rights eyes of the user, to produce the illusion of depth based on the principle of stereopsis. One or more output devices provide a representation of a mixed reality environment. The output device(s) can include any combination of display devices, such as a liquid crystal display panel, an organic light emitting diode panel (OLED), a digital light projector, etc.

A command-detecting engine 212 receives input information from one or more input devices. These input devices can include, without limitation: one or more video cameras (e.g., one or more gray-scale video cameras, one or more color video cameras, etc., or any combination thereof); one or more depth camera systems; a gaze-tracking system; one or more microphones (and an associated voice recognition system); one or more inertial measurement units (IMUs), etc. The command-detecting engine 212 can also receive input information from one or more controllers with which the user is currently interacting, such as the representative handheld controller 134 shown in FIG. 1.

Each video camera may produce red-green-blue (RGB) image information and/or monochrome grayscale information. The depth camera system produces depth image information based on image information provided by the video cameras. Each pixel of the depth image information represents a distance between a reference point associated with the HMD 126 and a point in the physical environment. The depth camera system can use any technology to measure the depth of points in the physical environment, including a time-of-flight technique, a structured light technique, a stereoscopic technique, etc., or any combination thereof. A time-of-flight technique and a structured light technique use an illumination source to irradiate the physical environment. That is, in one time-of-flight technique, the depth camera system may determine the distance between a surface point of interest in the physical environment and the reference point by determining the interval of time between the emission of a pulse of light by the illumination source and the detection of light that is reflected from the surface point. In one structured light technique, the depth camera system may project a pattern of light (e.g., a random speckle pattern, a stripe pattern, etc.) onto the physical environment and detect the manner in which the shapes in the physical environment have distorted the pattern.

The gaze-tracking system can determine the position of the user's eyes and/or head. The gaze-tracking system can determine the position of the user's eyes, by projecting light onto the user's eyes, and measuring the resultant glints that are reflected from the user's eyes. Illustrative information regarding the general topic of eye-tracking can be found, for instance, in U.S. Patent Application No. 20140375789 to Lou, et al., entitled "Eye-Tracking System for Head-Mounted Display," and published on published on Dec. 25, 2014. The gaze-tracking system can determine the position of the user's head based on IMU information supplied by the IMU(s).

The speech recognition system can receive and analyze voice signals provided by the microphone(s), e.g., using a neural network, a Hidden Markov Model (HMI), etc. The HMD 126 can leverage the speech recognition system to interpret commands spoken by the user.

The IMU(s) can determine the movement of the HMD 126 in six degrees of freedom. Each IMU can include one or more accelerometers, one or more gyroscopes, one or more magnetometers, etc., or any combination thereof.

The command-detecting engine 212 can analyze the input information in different ways. In one approach, the command-detecting engine 212 can include a feature generation component (not shown) for identifying a set of features that characterize the input information captured at each instance of time. Different implementations can rely on different features. The features can range from relatively raw information, such as color values associated with individual pixels of video input information, depth values provided by depth input information, audio waveform characteristics of voice signals, etc. Alternatively, or in addition, the features can include higher-level features. For example, the feature generation component can generate a skeletonized representation of the user's arms and/or hands, and then generate features which describe the positions of the joints associated with the arms and hands, the relationships between the joints, etc.

In one approach, the feature generation component characterizes the movements of the user's hands in their natural states, without special embellishment to aid detection. Alternatively, or in addition, the user can attach markers to his or her hands and/arms. Each marker can provide a unique visual pattern. Alternatively, or in addition, the user can affix a collection of light-emitting elements to his or her hands and/or arms, such as Light Emitting Diodes (LEDs). For example, the user may wear a glove, bracelet, finger ring, etc., each of which includes an array of LEDs. Alternatively, or in addition, the user can attach one or more magnetic signal emitters to his or her hands and/or arms, and so on. In these cases, the feature generation component operates by extracting detail from the input information which captures the presence of the markers, light-emitting elements, and/or magnetic signals. The feature generation component can produce a feature vector for each time instance that describes the states of these markers, light-emitting elements, and/or magnetic signals. For example, the state of a marker can describe its position, orientation, etc. relative to the user. Still other techniques are possible for generating features that describe the positions of the user's hands and/or arms and/or other body part(s).

The command-detecting engine 212 then analyzes the feature vectors fed to it to determine whether the user has performed a telltale gesture, voice command, etc. To perform this task, the command-detecting engine 212 can include any machine-learned model(s), including, without limitation: a Support Vector Machine (SVM) model, a Conditional Random Field (CRF) model, a deep neural network of any type(s) (such as a Convolutional Neural Network (CNN) model, a Recurrent Neural Network (RNN) model, etc.), a decision tree model, a Bayesian network model, a Hidden Markov Model (HMI), etc., or any combination thereof. For example, the command-detecting engine 212 can use an RNN model composed of a series of Long Short-Term Memory (LSTM) units. The LSTM units generate output results based on the feature vectors feed to them (each feature vector describing input information captured at a specific instance of time), together with hidden state information provided to them by their respective neighboring LSTM units. The command-detecting engine 212 can alternatively, or in addition, rely on an algorithm that does not use machine learning, such as a Dynamic Time Warping (DTW) algorithm, a rules-based system, etc.

Generally, the command-detecting engine 212 can be said to store pattern information in a data store 214 which characterizes each telltale gesture, voice command, etc. In the case of a machine-learning model, the data store 214 stores machine-learned parameter values which implicitly describe each gesture, voice command, etc. In the case of a rules-based system, the data store 214 can store one or more discrete rules which identify criteria for detecting each gesture, voice command, etc. For example, a rule can specify that a user has invoked an air tap gesture when the user moves his hand at a prescribed speed over a prescribed distance to simulate the act of tapping a physical object.

In other cases, the visualization tool 122 displays the three-dimensional depiction 124 on a two-dimensional display device, such as a computer monitor coupled to a workstation computing device, or a display screen associated with a handheld computing device (such as a tablet-type computing device), etc. In that scenario, the command-detecting engine 212 corresponds to program logic for detecting input actions that a user makes using a key input device, a mouse input device, a game controller-type input device, a touch-sensitive input mechanism, and so on. For example, the program logic can correspond to a module provided by the operating system that runs on the computing device.

The state visualization component 208 can optionally update the three-dimensional depiction 124 based on changes made by the user. For example, the state visualization component 208 can change the position of the current state on the surface of the Bloch sphere based on the user's request to change the angle $\theta$ and/or the angle $\varphi$.

Figure 3:
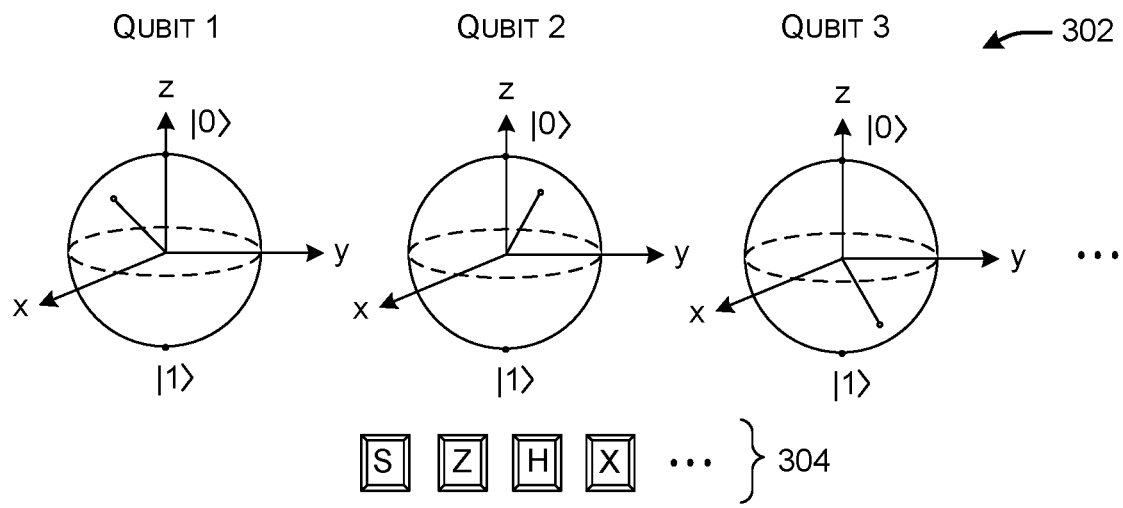
FIG. 3 shows another illustrative three-dimensional depiction that the visualization tool can present to the user.

Advancing to FIG. 3, the visualization tool 122 presents a three-dimensional depiction 302 that includes plural independent Bloch spheres. These spheres present plural instances of quantum state information with respect to an identified point of analysis of a quantum computer program. The visualization tool 122 permits this depiction, however, only upon determining that none of the qubits are entangled. The three-dimensional depiction 302 also shows at least one set of graphical control elements 304. Each graphical control element is associated with a single-qubit gate. Each Bloch sphere in the three-dimensional depiction 302 is also associated with a graphical control element (e.g., a graphical control field) which allows a user to manipulate it. More generally, a user may interact with the graphical control element associated with any Bloch sphere or the graphical control elements 304 in the same manner described above for FIG. 1.

Figure 4:
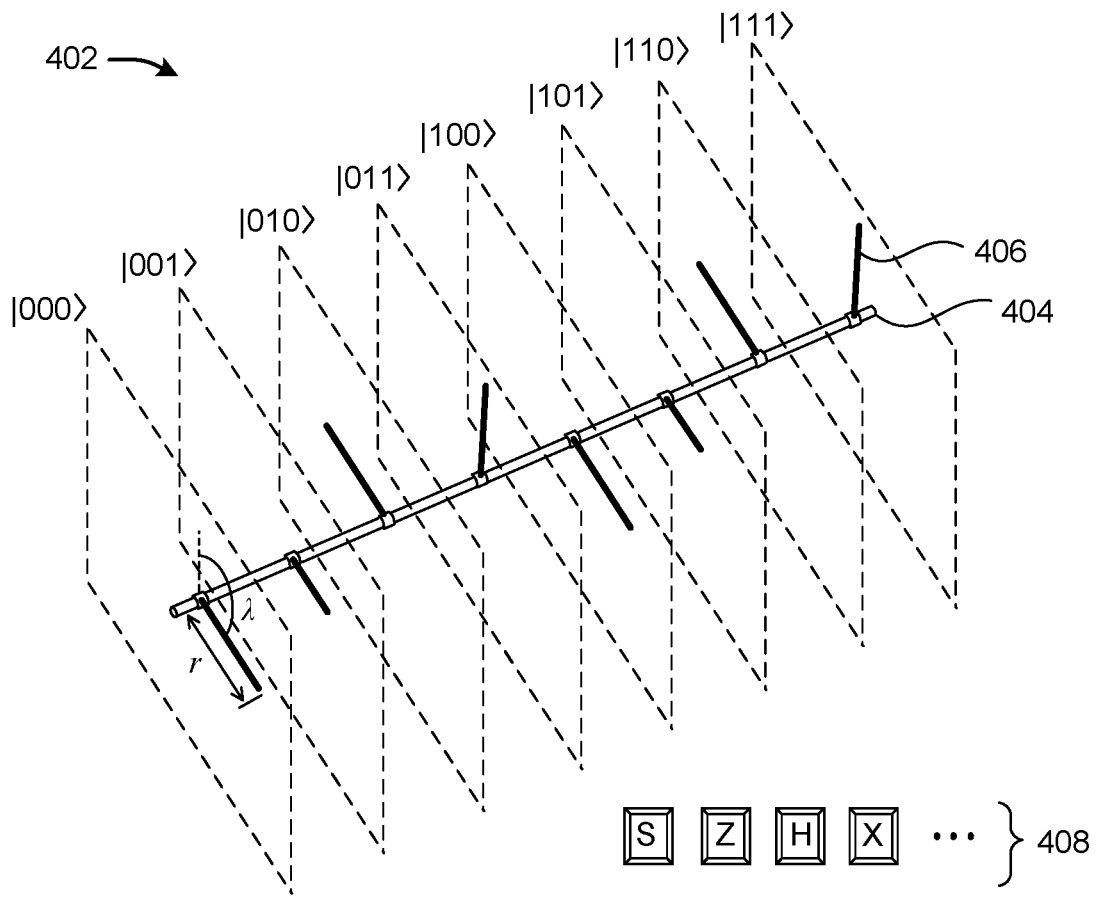
FIG. 4 shows another illustrative three-dimensional depiction that the visualization tool can present to the user.

In FIG. 4, the visualization tool 122 shows a third kind of three-dimensional depiction 402. This three-dimensional depiction 402 describes the probability amplitudes associated with an n-qubit state, where $n \geq 1$. In the specific example of FIG. 4, $n=3$. A state in this case represents a weighted combination of eight basis vectors: $|\psi\rangle = c_0 |000\rangle + c_1 |001\rangle + c_2 |010\rangle + \ldots c_7 |111\rangle$. Each term $c_j$ represents the $j^{th}$ probability amplitude, and corresponds to a complex number $c_j = a + bi$. The visualization tool 122 can present this kind of three-dimensional depiction 402 for both the case in which qubits associated with an n-qubit state are entangled, and the case in which the qubits are not entangled.

The three-dimensional depiction 402 includes a central axis 404 and eight bar portions which orthogonally extend from the central axis 404, such as representative bar portion 406. Each bar portion includes a length that represents the absolute value of an associated probability amplitude, and is given by: Length=$\sqrt{a^2+b^2}$. Each bar portion forms an angle $\lambda$ around the central axis 404 with respect to a reference starting location, and is given by:

$$\lambda = \arctan\frac{b}{a}.$$

More generally, the three-dimensional depiction 402 can include $2^n$ such bar portions for an n-qubit state.

The three-dimensional depiction 402 also includes a set of graphical control elements 408, each of which represents a quantum gate. A user may activate a quantum gate by executing a telltale command, such as gazing at an appropriate graphical control element and executing an air tap gesture. In addition to choosing a gate in the above manner, the user may interact with the three-dimensional depiction 402 to choose the qubit(s) to which the gate is to be applied (if there are more than one qubit being analyzed). For example, to apply a single-qubit gate, the user can choose the qubit to which the gate is to be applied. The user may choose the qubit in any manner, e.g., by gazing at a graphical control associated with the qubit (not shown) and executing an air tap gesture.

Assume that a user applies a single-qubit gate U (where U generically represents any transformation) to a qubit that is entangled with one other qubit. Upon receiving the modification request associated with this desired change, the emulator 110 carries it out by taking the tensor product of the selected gate U with the identity matrix I. The resultant tensor product (U⊗I) will operate on both qubits. To encompass yet another entangled qubit, the emulator 110 forms the tensor product of the result U⊗I with yet another instance of the identity matrix I, to achieve the net result of U⊗I⊗I, and so on.

Although not shown, the three-dimensional graphical depiction 402 may optionally allow the user to apply a multi-qubit gate to the current state. For example, the user may apply a controlled NOT (CNOT) gate to the current state.

Note that the visualization tool 122 can simulate yet other quantum effects, such as decoherence, and can alert the user to those effects. A quantum computing system is said to be coherent to the extent that there is a predictable relation of phases between its states, given by the wave function of quantum mechanics. A quantum computing system suffers from decoherence when noise from the environment corrupts this predictable relation among phases. Various models have been used to estimate the negative effects of decoherence, such as: Dmitry Solenov, et al., "Evaluation of Decoherence for Quantum Computing Architectures: Qubit System Subject to Time-Dependent Control," arXiv:cond-mat/0506286v2 [cond-mat.mes-hall], November 2005, 25 pages; Arkady Fedorov, et al., "Evaluation of Decoherence for Quantum Control and Computing," arXiv:cond-mat/0401248v2 [cond-mat.mes-hall], July 2004, 26 pages; Kevin M. Obenland, et al., "Simulating the Effect of Decoherence and Inaccuracies on a Quantum Computer," arXiv:quant-ph/9804038v1, April 1998, 12 pages, etc.

The visualization tool 122 can alert the user to the effects of decoherence in different ways. For example, when displaying a Bloch sphere, the visualization tool 122 can modify the angles θ and φ to account for the influence of decoherence. It can also display the graphical marker 128 in a manner to convey that it no longer represents a pure state of vector length 1, e.g., by modifying the color of the graphical marker 128 from green to red, etc. In addition, or alternatively, the visualization tool 122 can display an alert whenever the influence of decoherence exceeds an environment-specific threshold value, with respect to a particular point under analysis in the quantum computing program. For example, the visualization tool 122 can determine that a user's request to add one or more gates will have the effect of increasing decoherence beyond an environment-specific threshold. In that case, the visualization tool 122 can display an alert to the user which notifies him or her of that outcome. Or it may prevent the user from making this change.

B. Illustrative Processes

Figure 6:
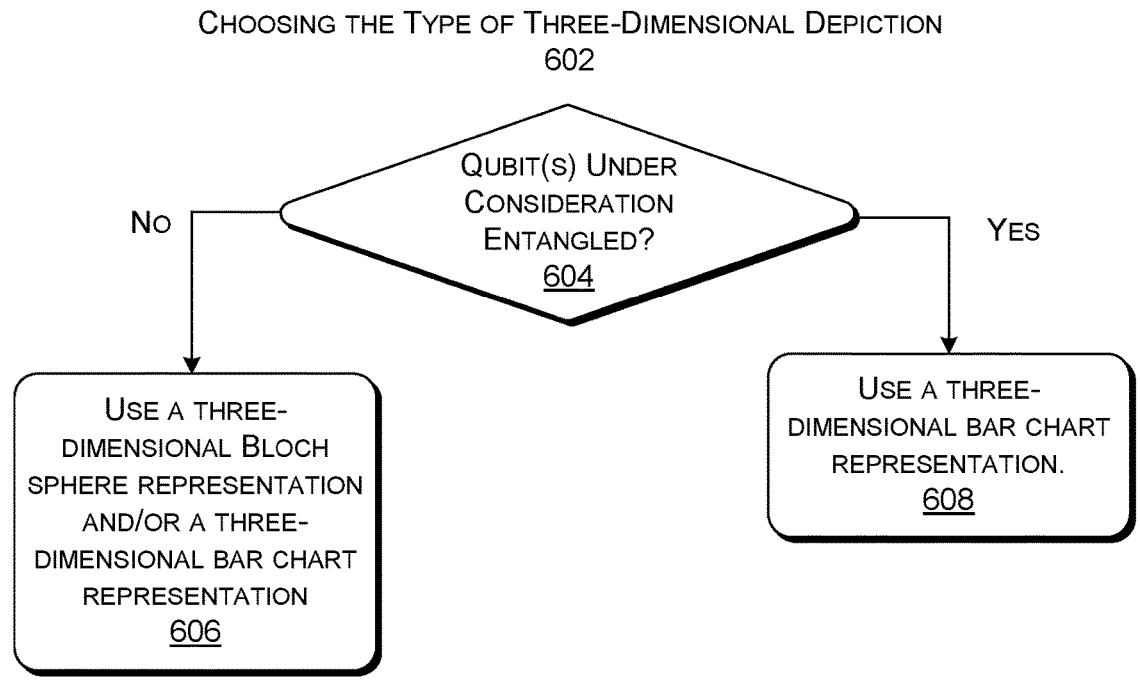
FIG. 6 is a flowchart that shows one process by which the visualization tool of FIG. 1 can determine what kind of three-dimensional depiction to present to the user.
Figure 7:
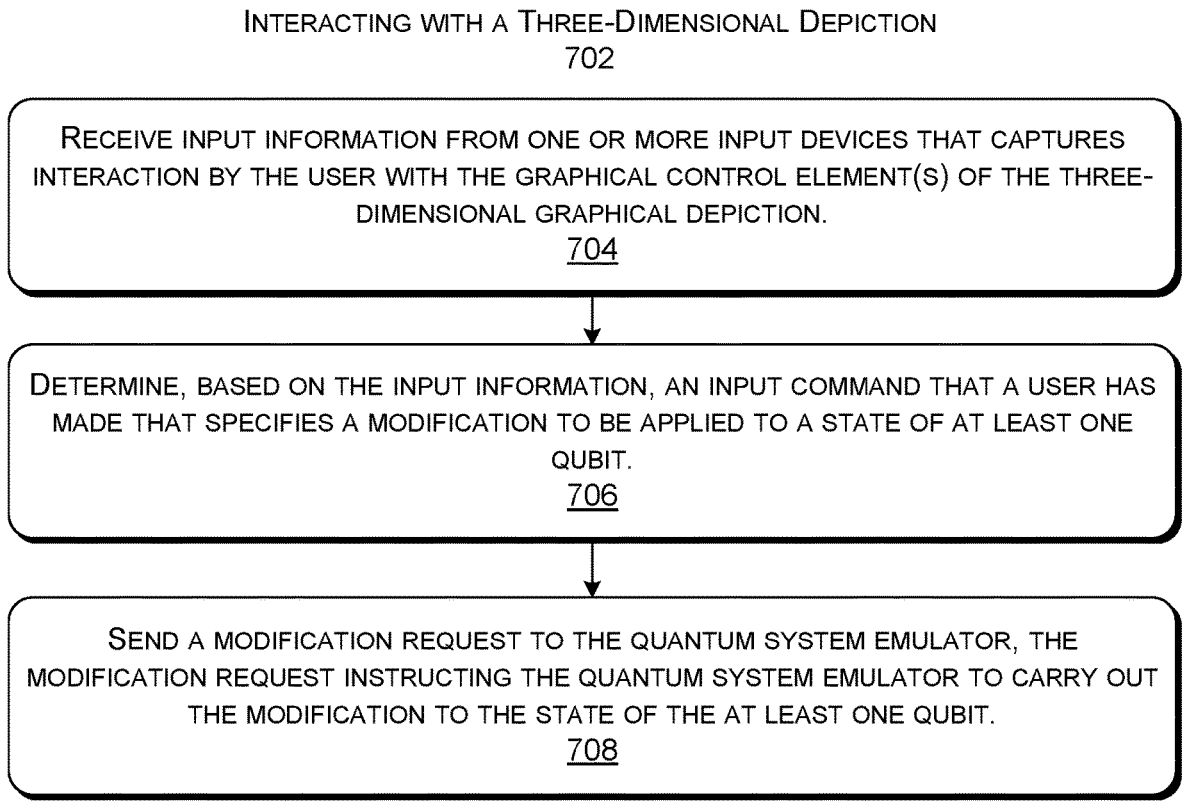
FIG. 7 is a flowchart that shows one process by which the visualization tool of FIG. 1 can respond to a user command.

FIGS. 5-7 show processes that explain the operation of the visualization tool 122 of Section A in flowchart form. Since the principles underlying the operation of the visualization tool 122 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 5 shows a process 502 for generating a three-dimensional depiction. In block 504, the visualization tool 122 receives qubit state information from the quantum system emulator 110. The quantum system emulator 110 executes a quantum computer program. The qubit state information describes one or more states of one or more respective qubits at a specified analysis point in the quantum computer program. In block 506, the visualization tool 122 generates a three-dimensional graphical depiction that provides a visualization of the qubit state information. In some cases, the three-dimensional graphical depiction includes at least one graphical control element that allows a user to interact with the three-dimensional graphical depiction. In block 508, the visualization tool 122 displays the three-dimensional graphical depiction on a display device.

FIG. 6 shows a process 602 for governing a type of display presentation provided by the visualization tool 122. In block 604, the visualization tool 122 determines whether the qubit(s) under consideration are entangled. If not, in block 606, the visualization tool 122 presents a first display presentation and/or a second display presentation. The first display presentation includes one or more three-dimensional representations of one or more respective Bloch spheres, associated with one or more respective qubits. FIGS. 1 and 3 show examples of the first display presentation. The second display presentation includes a three-dimensional representation of a bar chart that conveys information regarding probability amplitudes associated with an n-qubit state. FIG. 4 shows an example of the second display presentation. In block 608, if the qubit(s) are determined to be entangled, the visualization tool presents only the second display presentation.

FIG. 7 shows a process 702 for handling a user's interaction with a three-dimensional depiction. In block 704, the visualization tool 122 receives input information from one or more input devices 802 that captures interaction by the user with the graphical control element(s) of the three-dimensional graphical depiction. In block 706, the visualization tool 122 determines, based on the input information, an input command that a user has made that specifies a modification to be applied to a state of at least one qubit. In block 708, the visualization tool sends a modification request to the quantum system emulator 110, the modification request instructing the quantum system emulator 110 to carry out the modification to the state of the at least one qubit.

C. Representative Head Mounted Display

Figure 8:
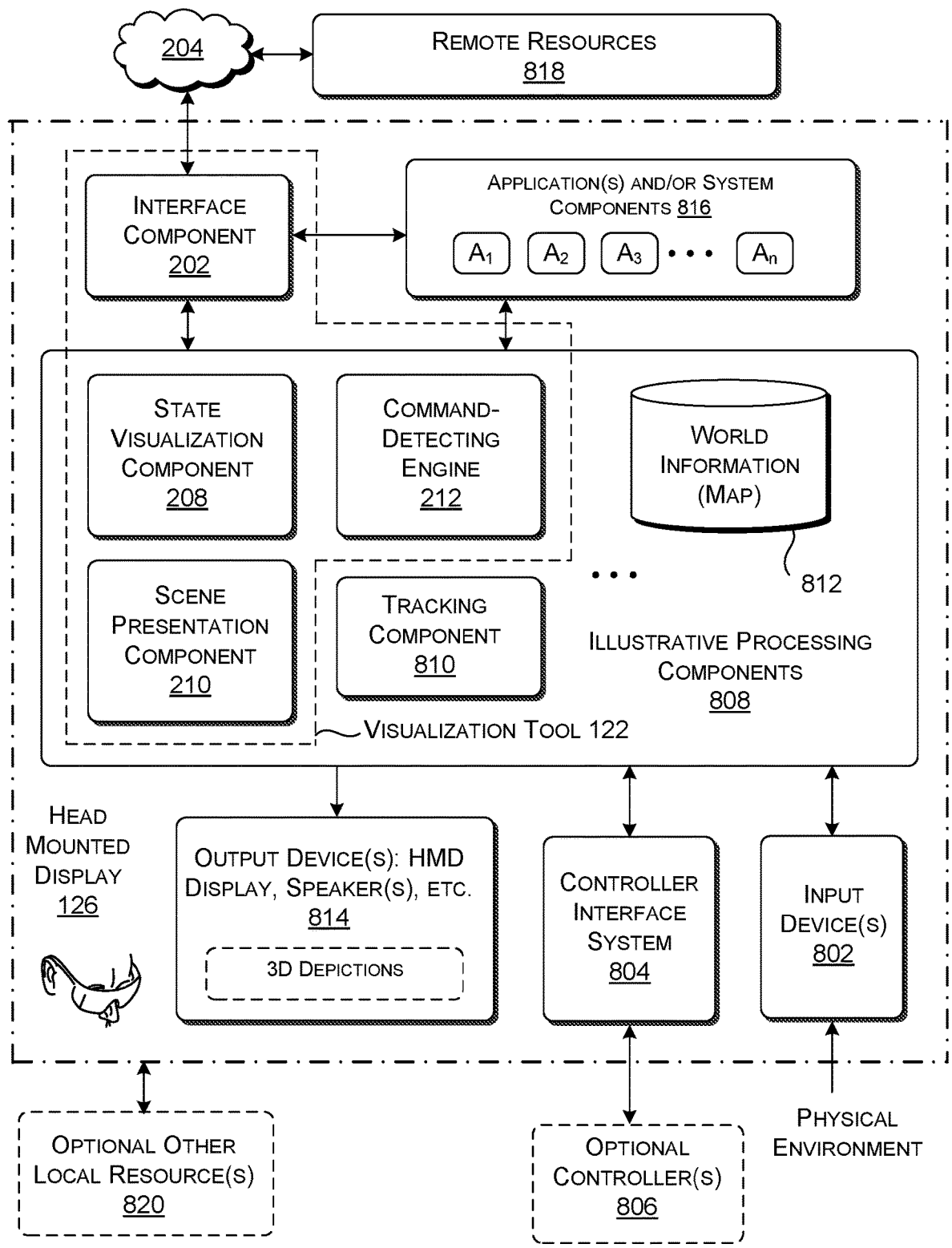
FIG. 8 shows an illustrative head mounted display that can implement at least part of the visualization tool shown in FIG. 1.

FIG. 8 shows one implementation of the HMD 126 introduced above. The HMD 126 includes one or more input devices 802, mentioned above, for providing environment input information, including, but not limited to: one or more environment-facing video cameras; an environment-facing depth camera system; a gaze-tracking system; an inertial measurement unit (IMU), etc. In an inside-out implementation, the HMD 126 provides all of the input device(s) 802. For example, the input device(s) 802 can include plural video cameras integrated with the HMD, a depth camera system integrated with the HMD, etc. In another implementation, at least one input device may be provided that is separate from the HMD 126, and which provides the input information it collects to the HMD 126.

An optional controller interface system 804 handles interaction with one or more controllers 806. For example, a controller can correspond to a device which the user manipulates with a hand, a body-worn device, etc. The controller interface system 804 can interact with each controller, for instance, based on electromagnetic radiation and/or magnetic fields emitted by each controller. The controller interface system 804 can also interact with each controller through a separate local data channel, such as a BLUETOOTH channel, a WIFI channel etc. Alternatively, the controller interface system 804 can interact with each controller through a physical cable.

A collection of processing components 808 process the environment input information provided by the input device(s) 802 and/or the controller interface system 804, to provide a mixed reality experience. For instance, a tracking component 810 determines the position and orientation of the HMD 126 in the physical environment, with respect to a world coordinate space. In one implementation, the tracking component 810 can determine the position and orientation of the HMD 126 using Simultaneous Localization and Mapping (SLAM) technology. The SLAM technology progressively builds a map of the physical environment. Further, at each instance, the SLAM technology determines the position and orientation of the HMD 126 with respect to the map in its current state. A data store 812 stores the map in its current state. Information regarding the general topic of SLAM can be found in various sources, such as Durrant-Whyte, et al., "Simultaneous Localization and Mapping (SLAM): Part I," in IEEE Robotics & Automation Magazine, Vol. 13, No. 2, June 2006, pp. 99-110, and Bailey, et al., "Simultaneous Localization and Mapping (SLAM): Part II," in IEEE Robotics & Automation Magazine, Vol. 13, No. 3, September 2006, pp. 108-117.

The processing components 808 can also include the above-described state visualization tool 122, including at least the state visualization component 208, the scene presentation component 210, and the command-detecting engine 212. Although not shown in FIG. 8, the processing components 808 can also include additional functionality, such as a surface reconstruction component. In one implementation, the surface reconstruction component uses the marching cubes algorithm to create surfaces based on input information provided by the depth camera system.

One or more output device(s) 814 provide a representation of a mixed reality environment that includes any kind of three-dimensional depiction described above. The output device(s) 814 can include any combination of display devices, such as a liquid crystal display panel, an organic light emitting diode panel (OLED), a digital light projector, etc. The output device(s) 814 may also include one or more speakers. The HMD 126 can use known techniques (e.g., using head-related transfer functions (HRTFs)) to provide directional sound information to the speakers, which the user perceives as originating from a particular location within the physical environment.

The HMD 126 can include a collection of local applications and/or system components 816, stored in a local data store. Each local application and/or system component can perform any function.

Note that FIG. 8 indicates that the above-described components are housed within a single physical unit associated with the HMD 126. While this represents one viable implementation of the HMD 126, in other cases, any of the functions described above can alternatively, or in addition, be implemented by one or more remote resources 818 and/or one or more local resources 820. Similarly, any of the information described above can alternatively, or in addition, be stored by the remote resources 818 and/or the local resources 820. The remote resources 818 may correspond to one or more remote servers and/or other remote processing devices. The local resources 820 may correspond to one or more processing devices that are located within the same physical environment as the HMD 126. For example, a local processing device may correspond to a device that the user fastens to his or her belt. In view of the above, what is referred to herein as the HMD 126 may encompass processing components distributed over any number of physical processing devices.

The interface component 202 allows the HMD 126 to interact with the information transfer system 120 (not shown in FIG. 8) and the remote resources 818 via the computer network 204. The interface component 202 may correspond to a network card or other kind of interface mechanism. The computer network 204 can correspond to a local area network, a wide area network (e.g., the Internet), one or more point-to-point links, etc., or any combination thereof. The HMD 126 can interact with the optional local resources 820 through any communication mechanism, such as a BLUETOOH link, a WIFI link, a hardwired connection, etc.

Figure 9:
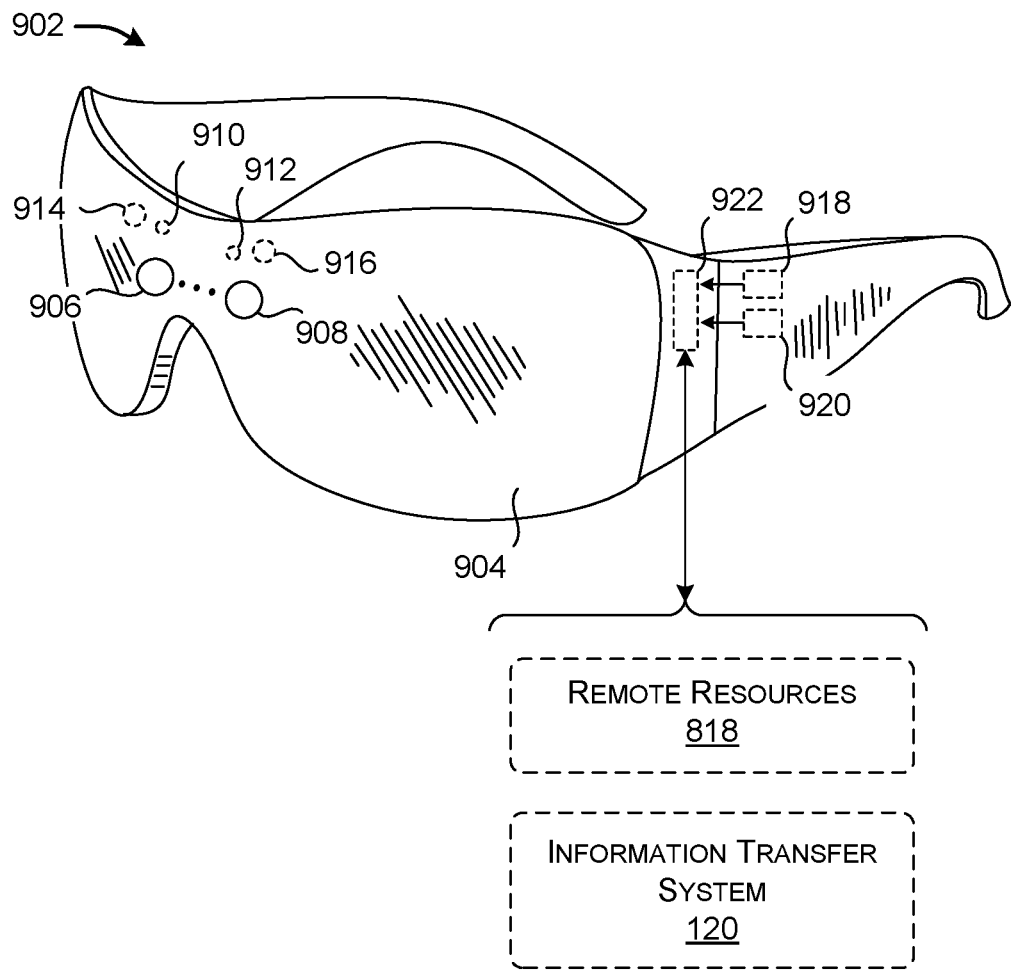
FIG. 9 shows illustrative physical components provided by the head mounted display of FIG. 8.

FIG. 9 shows illustrative and non-limiting structural aspects of a head-mounted display (HMD) 902, which corresponds to one implementation of the HMD 126 of FIG. 8. The HMD 902 includes a head-worn frame that houses or otherwise affixes a display device 904, e.g., corresponding to an opaque (non-see-through) display device or a see-through display device. Waveguides (not shown) or other image information conduits direct left-eye images to the left eye of the user and direct right-eye images to the right eye of the user, to overall create the illusion of depth through the effect of stereopsis. Although not shown, the HMD 902 can also include speakers for delivering sounds to the ears of the user.

The HMD 902 can include any environment-facing imaging components, such as representative environment-facing imaging components 906 and 908. The imaging components (906, 908) can include RGB cameras, monochrome cameras, a depth camera system (including an optional illumination source), etc. While FIG. 9 shows only two imaging components (906, 908), the HMD 902 can include any number of such components. The HMD 902 can optionally include an inward-facing gaze-tracking system. For example, the inward-facing gaze-tracking system can include light sources (910, 912) for directing light onto the eyes of the user, and cameras (914, 916) for detecting the light reflected from the eyes of the user.

The HMD 902 can also include other input mechanisms, such as one or more microphones 918, an inertial measurement unit (IMU) 920, etc. As explained above, the IMU 920 can include one or more accelerometers, one or more gyroscopes, one or more magnetometers, etc., or any combination thereof.

A control engine 922 can include logic for performing any of the tasks described above, e.g., with reference to FIGS. 5-7. The control engine 922 may optionally interact with the remote resources 818 and the information transfer system 120 via the interface component 202, and/or the local resources 820.

D. Representative Computing Functionality

Figure 10:
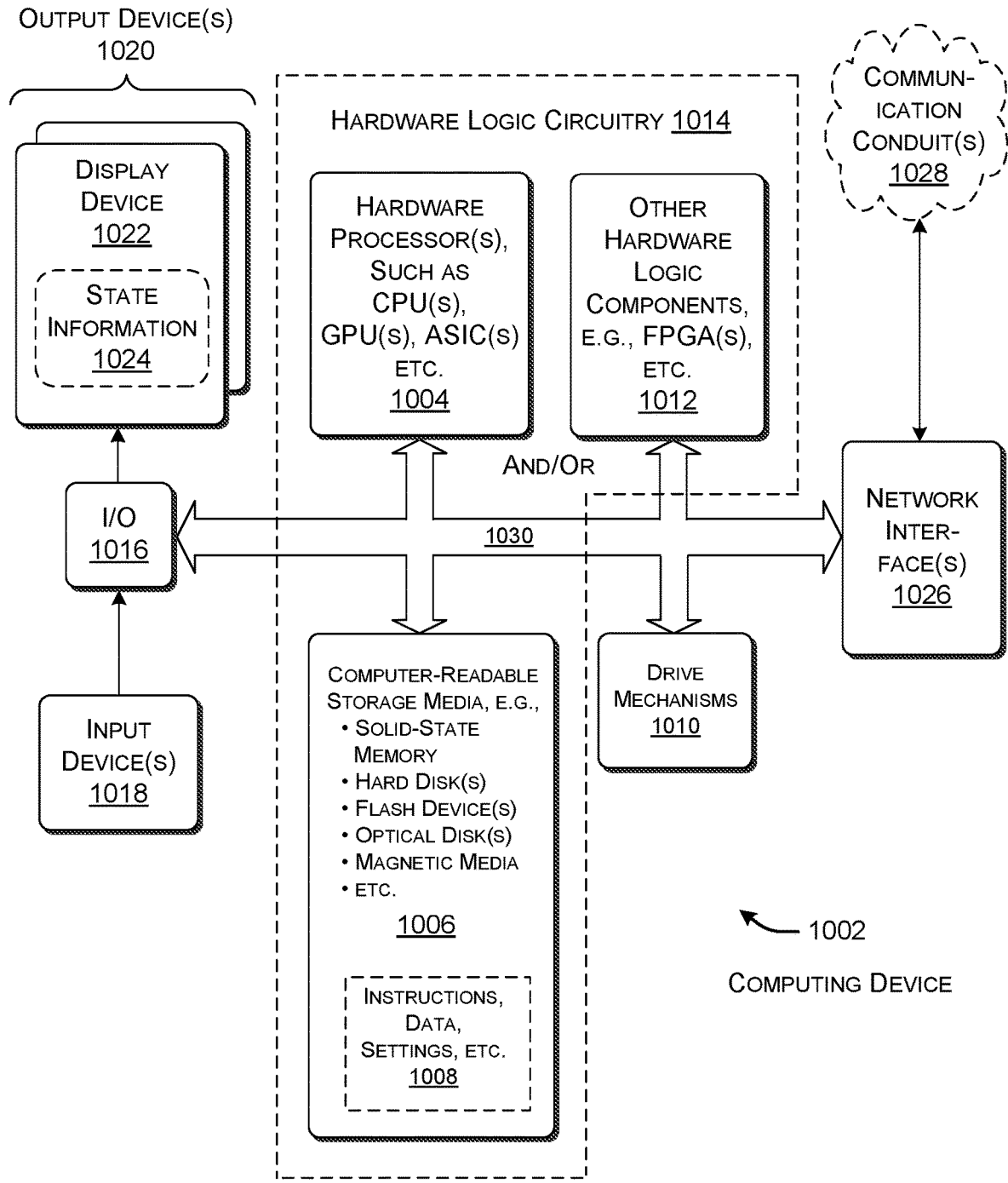
FIG. 10 shows an illustrative type of computing device that can be used to implement any aspect of the features shown in the foregoing drawings.

FIG. 10 shows a computing device 1002 that can be used to implement any aspect of the mechanisms set forth in the above-described figures. For instance, with reference to FIG. 1, the type of computing device 1002 shown in FIG. 10 can be used to implement any of the development tool 104, the information transfer system 120, and the visualization tool 122. In all cases, the computing device 1002 represents a physical and tangible processing mechanism.

The computing device 1002 can include one or more hardware processors 1004. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1002 can also include computer-readable storage media 1006, corresponding to one or more computer-readable media hardware units. The computer-readable storage media 1006 retains any kind of information 1008, such as machine-readable instructions, settings, data, etc. Without limitation, for instance, the computer-readable storage media 1006 may include one or more solid-state devices, one or more magnetic hard disks, one or more optical disks, magnetic tape, and so on. Any instance of the computer-readable storage media 1006 can use any technology for storing and retrieving information. Further, any instance of the computer-readable storage media 1006 may represent a fixed or removable component of the computing device 1002. Further, any instance of the computer-readable storage media 1006 may provide volatile or non-volatile retention of information.

The computing device 1002 can utilize any instance of the computer-readable storage media 1006 in different ways. For example, any instance of the computer-readable storage media 1006 may represent a hardware memory unit (such as Random Access Memory (RAM)) for storing transient information during execution of a program by the computing device 1002, and/or a hardware storage unit (such as a hard disk) for retaining/archiving information on a more permanent basis. In the latter case, the computing device 1002 also includes one or more drive mechanisms 1010 (such as a hard drive mechanism) for storing and retrieving information from an instance of the computer-readable storage media 1006.

The computing device 1002 may perform any of the functions described above when the hardware processor(s) 1004 carry out computer-readable instructions stored in any instance of the computer-readable storage media 1006. For instance, the computing device 1002 may carry out computer-readable instructions to perform each block of the processes described in Section B.

Alternatively, or in addition, the computing device 1002 may rely on one or more other hardware logic components 1012 to perform operations using a task-specific collection of logic gates. For instance, the hardware logic component(s) 1012 may include a fixed configuration of hardware logic gates, e.g., that are created and set at the time of manufacture, and thereafter unalterable. Alternatively, or in addition, the other hardware logic component(s) 1012 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 10 generally indicates that hardware logic circuitry 1014 includes any combination of the hardware processor(s) 1004, the computer-readable storage media 1006, and/or the other hardware logic component(s) 1012. That is, the computing device 1002 can employ any combination of the hardware processor(s) 1004 that execute machine-readable instructions provided in the computer-readable storage media 1006, and/or one or more other hardware logic component(s) 1012 that perform operations using a fixed and/or programmable collection of hardware logic gates. More generally stated, the hardware logic circuitry 1014 corresponds to one or more hardware logic components of any type(s) that perform operations based on logic stored in and/or otherwise embodied in the hardware logic component(s).

In some cases (e.g., in the case in which the computing device 1002 represents a user computing device), the computing device 1002 also includes an input/output interface 1016 for receiving various inputs (via input devices 1018), and for providing various outputs (via output devices 1020). Illustrative input devices and output devices were described above in Section C. One particular output mechanism may include a display device 1022 that provides a three-dimensional depiction of quantum state information 1024. The computing device 1002 can also include one or more network interfaces 1026 for exchanging data with other devices via one or more communication conduits 1028. One or more communication buses 1030 communicatively couple the above-described components together.

The communication conduit(s) 1028 can be implemented in any manner, e.g., by a local area computer network, a wide area computer network (e.g., the Internet), point-to-point connections, etc., or any combination thereof. The communication conduit(s) 1028 can include any combination of hardwired links, wireless links, routers, gateway functionality, name servers, etc., governed by any protocol or combination of protocols.

FIG. 10 shows the computing device 1002 as being composed of a discrete collection of separate units. In some cases, the collection of units may correspond to discrete hardware units provided in a computing device chassis having any form factor. In other cases, the computing device 1002 can include a hardware logic component that integrates the functions of two or more of the units shown in FIG. 1. For instance, the computing device 1002 can include a system on a chip (SoC or SOC), corresponding to an integrated circuit that combines the functions of two or more of the units shown in FIG. 10.

The following summary provides a non-exhaustive set of illustrative aspects of the technology set forth herein.

According to a first aspect, one or more computing devices for facilitating interaction with a quantum computer program are described. The computing device(s) includes hardware logic circuitry, the hardware logic circuitry including: (a) one or more hardware processors that perform operations by executing machine-readable instructions stored in a memory, and/or (b) one or more other hardware logic components that perform operations using a task-specific collection of logic gates. The operations include receiving qubit state information from a quantum system emulator. The quantum system emulator executes a quantum computer program, and the qubit state information describes one or more states of one or more respective qubits at a specified analysis point in the quantum computer program. The method also includes: generating a three-dimensional graphical depiction that provides a visualization of the qubit state information, the three-dimensional graphical depiction including at least one graphical control element that allows a user to interact with the three-dimensional graphical depiction; and displaying the three-dimensional graphical depiction on a display device.

According to a second aspect, the receiving includes receiving the qubit state information from the quantum system emulator via an information transfer system.

According to a third aspect, the display device corresponds to a display device of a head mounted display that provides a mixed reality experience.

According to a fourth aspect, the display device corresponds to a two-dimensional display monitor.

According to a fifth aspect, the three-dimensional graphical depiction provides a three-dimensional representation of a Bloch sphere for a single qubit.

According to a sixth aspect, the three-dimensional graphical depiction provides plural three-dimensional representations of plural respective Bloch spheres, associated with plural respective qubits that are not entangled.

According to a seventh aspect, the three-dimensional graphical depiction provides a three-dimensional representation of a bar chart that includes a central axis and plural bar portions which protrude from the central axis. The bar portions are associated with respective basis vectors of an n-qubit state. Each basis vector of the n-qubit state is associated with a probability amplitude. Each bar portion has a length that is based on an absolute value of a probability amplitude associated with the bar portion. Each bar portion has a direction that is based on a phase value of the probability amplitude associated with the bar portion.

According to an eighth aspect, related to the seventh aspect, the operation of generating includes presenting the three-dimensional representation of the bar chart for two or more qubits when it is determined that the two or more qubits are entangled.

According to a ninth aspect, the at least one graphical control element includes one or more graphical control buttons associated with respective one or more quantum gates.

According to a tenth aspect, the operations further include: receiving input information from one or more input devices that captures interaction by the user with the at least one graphical control element associated with the three-dimensional graphical depiction; determining, based on the input information, an input command that a user has made that specifies a modification to be applied to a state of at least one qubit; and sending a modification request to the quantum system emulator, the modification request instructing the quantum system emulator to carry out the modification to the state of the at least one qubit.

According to an eleventh aspect, related to the tenth aspect, the three-dimensional graphical depiction provides a three-dimensional representation of a Bloch sphere. The at least one graphical control element includes a graphical control element that is associated with the Bloch sphere, which allows interaction by the user with the Bloch sphere. The qubit state corresponds to a point on a surface of the Bloch sphere. The point on the surface of the Bloch sphere has a position determined by: a first angle with respect to a first axis of the three-dimensional graphical depiction; and a second angle with respect to a second axis of the three-dimensional graphical representation. The input command specifies a request by the user to interact with the graphical control element to change the first angle and/or the second angle.

According to a twelfth aspect, related to the tenth aspect, the at least one graphical control element includes one or more graphical control buttons associated with respective one or more quantum gates. The input command specifies a request by the user to activate one of the one or more graphical control buttons.

According to a thirteenth aspect, related to the tenth aspect, the one or more input devices are associated with a head mounted display, and include: a gaze-tracking system; and/or one or more video cameras; and/or one or more depth camera systems; and/or one or more microphones in conjunction with a voice recognition system; and/or a controller interface system which detects interaction by the user with one or more handheld and/or body-worn controllers.

According to a fourteenth aspect, a method, implemented by one or more computing devices, is described for facilitating interaction with a quantum computer program. The method includes receiving qubit state information from a quantum system emulator. The quantum system emulator executes a quantum computer program. The qubit state information describes one or more states of one or more respective qubits at a specified analysis point in the quantum computer program. The method further includes: generating a three-dimensional graphical depiction that provides a visualization of the qubit state information; displaying the three-dimensional graphical depiction on a display device; receiving input information from one or more input devices that captures interaction by the user with at least one graphical control element associated with the three-dimensional graphical depiction; determining, based on the input information, an input command that a user has made that specifies a modification to be applied to a state of at least one qubit; and sending a modification request to the quantum system emulator, the modification request instructing the quantum system emulator to carry out the modification to the state of the at least one qubit.

According to a fifteenth aspect, related to the fourteenth aspect, the display device corresponds to a display device of a head mounted display device that provides a mixed reality experience.

According to a sixteenth aspect, related to the fourteenth aspect, the display device corresponds to a two-dimensional display monitor.

According to a seventeenth aspect, related to the fourteenth aspect, the three-dimensional graphical depiction provides a three-dimensional representation of a Bloch sphere. The at least one graphical control element includes a graphical control element that is associated with the Bloch sphere, which allows interaction by the user with the Bloch sphere. A qubit state corresponds to a point on a surface of the Bloch sphere. The point on the surface of the Bloch sphere has a position determined by: a first angle with respect to a first axis of the three-dimensional graphical depiction; and a second angle with respect to a second axis of the three-dimensional graphical representation. The input command specifies a request by the user to interact with the graphical control element to change the first angle and/or the second angle.

According to an eighteenth aspect, related to the fourteenth aspect, the at least one graphical control element includes one or more graphical control buttons associated with respective one or more quantum gates. The input command specifies a request by the user to activate one of said one or more graphical control buttons.

According to a nineteenth aspect, related to the fourteenth aspect, the three-dimensional graphical depiction provides a three-dimensional representation of a bar chart that includes a central axis and plural bar portions which protrude from the central axis. The bar portions are associated with respective basis vectors of an n-qubit state. Each basis vector of the n-qubit state is associated with a probability amplitude. Each bar portion has a length that is based on an absolute value of a probability amplitude associated with the bar portion. Each bar portion has a direction that is based on a phase value of the probability amplitude associated with the bar portion.

According to a twentieth aspect, a computer-readable storage medium is described for storing computer-readable instructions. The computer-readable instructions, when executed by one or more hardware processors, perform a method that includes receiving qubit state information from a quantum system emulator. The quantum system emulator executes a quantum computer program. The qubit state information describes one or more states of one or more respective qubits at a specified analysis point in the quantum computer program. The method further includes: generating a three-dimensional graphical depiction that provides a visualization of the qubit state information; and displaying the three-dimensional graphical depiction on a display device. The three-dimensional graphical depiction corresponds to a depiction selected from among: a first display presentation that includes one or more three-dimensional representations of one or more respective Bloch spheres, associated with one or more respective qubits; and a second display presentation that includes a three-dimensional representation of a bar chart that conveys information regarding probability amplitudes associated with an n-qubit state. The method provides the first display presentation and/or the second display presentation for a case in which a set of qubits under consideration are not entangled, and provides the second display presentation for the case in which the set of qubits under consideration are entangled.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for facilitating interaction with a quantum computer program, comprising:
   hardware logic circuitry, the hardware logic circuitry including: (a) one or more hardware processors that perform operations by executing machine-readable instructions stored in a memory, and/or (b) one or more other hardware logic components that perform operations using a task-specific collection of logic gates, the operations including:
   receiving qubit state information from a quantum system emulator,
      the quantum system emulator executing a quantum computer program, and
      the qubit state information describing one or more states of one or more respective qubits at a specified analysis point in the quantum computer program;
   generating a three-dimensional graphical depiction that provides a visualization of the qubit state information, the three-dimensional graphical depiction including at least one graphical control element that allows a user to interact with the three-dimensional graphical depiction; and
   displaying the three-dimensional graphical depiction on a display device.

2. The one or more computing devices of claim 1, wherein said receiving comprises receiving the qubit state information from the quantum system emulator via an information transfer system.

3. The one or more computing devices of claim 1, wherein the display device corresponds to a display device of a head mounted display that provides a mixed reality experience.

4. The one or more computing devices of claim 1, wherein the display device corresponds to a two-dimensional display monitor.

5. The one or more computing devices of claim 1, wherein the three-dimensional graphical depiction provides a three-dimensional representation of a Bloch sphere for a single qubit.

6. The one or more computing devices of claim 1, wherein the three-dimensional graphical depiction provides plural three-dimensional representations of plural respective Bloch spheres, associated with plural respective qubits that are not entangled.

7. The one or more computing devices of claim 1,
   wherein the three-dimensional graphical depiction provides a three-dimensional representation of a bar chart that includes a central axis and plural bar portions which protrude from the central axis,
   wherein the bar portions are associated with respective basis vectors of an n-qubit state,
   wherein each basis vector of the n-qubit state is associated with a probability amplitude,
   wherein each bar portion has a length that is based on an absolute value of a probability amplitude associated with the bar portion, and wherein each bar portion has a direction that is based on a phase value of the probability amplitude associated with the bar portion.

8. The one or more computing devices of claim 7, wherein said generating comprises presenting the three-dimensional representation of the bar chart for two or more qubits when it is determined that said two or more qubits are entangled.

9. The one or more computing devices of claim 1, wherein said at least one graphical control element includes one or more graphical control buttons associated with respective one or more quantum gates.

10. The one or more computing devices of claim 1, wherein the operations further comprise:
receiving input information from one or more input devices that captures interaction by the user with said at least one graphical control element associated with the three-dimensional graphical depiction;
determining, based on the input information, an input command that a user has made that specifies a modification to be applied to a state of at least one qubit; and
sending a modification request to the quantum system emulator, the modification request instructing the quantum system emulator to carry out the modification to the state of said at least one qubit.

11. The one or more computing devices of claim 10, wherein the three-dimensional graphical depiction provides a three-dimensional representation of a Bloch sphere,
wherein said at least one graphical control element includes a graphical control element that is associated with the Bloch sphere, which allows interaction by the user with the Bloch sphere,
wherein the qubit state corresponds to a point on a surface of the Bloch sphere,
wherein the point on the surface of the Bloch sphere has a position determined by: a first angle with respect to a first axis of the three-dimensional graphical depiction; and a second angle with respect to a second axis of the three-dimensional graphical representation, and
wherein the input command specifies a request by the user to interact with the graphical control element to change the first angle and/or the second angle.

12. The one or more computing devices of claim 10, wherein said at least one graphical control element includes one or more graphical control buttons associated with respective one or more quantum gates, and
wherein the input command specifies a request by the user to activate one of said one or more graphical control buttons.

13. The one or more computing devices of claim 10, wherein said one or more input devices are associated with a head mounted display, and include:
a gaze-tracking system; and/or
one or more video cameras; and/or
one or more depth camera systems; and/or
one or more microphones in conjunction with a voice recognition system; and/or
a controller interface system which detects interaction by the user with one or more handheld and/or body-worn controllers.

14. A method, implemented by one or more computing devices, for facilitating interaction with a quantum computer program, comprising:
receiving qubit state information from a quantum system emulator,
the quantum system emulator executing a quantum computer program, and
the qubit state information describing one or more states of one or more respective qubits at a specified analysis point in the quantum computer program;
generating a three-dimensional graphical depiction that provides a visualization of the qubit state information;
displaying the three-dimensional graphical depiction on a display device;
receiving input information from one or more input devices that captures interaction by the user with at least one graphical control element associated with the three-dimensional graphical depiction;
determining, based on the input information, an input command that a user has made that specifies a modification to be applied to a state of at least one qubit; and
sending a modification request to the quantum system emulator, the modification request instructing the quantum system emulator to carry out the modification to the state of said at least one qubit.

15. The method of claim 14, wherein the display device corresponds to a display device of a head mounted display device that provides a mixed reality experience.

16. The method of claim 14, wherein the display device corresponds to a two-dimensional display monitor.

17. The method of claim 14,
wherein the three-dimensional graphical depiction provides a three-dimensional representation of a Bloch sphere,
wherein said at least one graphical control element includes a graphical control element that is associated with the Bloch sphere, which allows interaction by the user with the Bloch sphere,
wherein a qubit state corresponds to a point on a surface of the Bloch sphere,
wherein the point on the surface of the Bloch sphere has a position determined by: a first angle with respect to a first axis of the three-dimensional graphical depiction; and a second angle with respect to a second axis of the three-dimensional graphical representation, and
wherein the input command specifies a request by the user to interact with the graphical control element to change the first angle and/or the second angle.

18. The method of claim 14,
wherein said at least one graphical control element includes one or more graphical control buttons associated with respective one or more quantum gates,
wherein the input command specifies a request by the user to activate one of said one or more graphical control buttons.

19. The method of claim 14,
wherein the three-dimensional graphical depiction provides a three-dimensional representation of a bar chart that includes a central axis and plural bar portions which protrude from the central axis,
wherein the bar portions are associated with respective basis vectors of an n-qubit state,
wherein each basis vector of the n-qubit state is associated with a probability amplitude,
wherein each bar portion has a length that is based on an absolute value of a probability amplitude associated with the bar portion, and
wherein each bar portion has a direction that is based on a phase value of the probability amplitude associated with the bar portion.

20. A computer-readable hardware storage medium for storing computer-readable instructions, the computer-readable instructions, when executed by one or more hardware processors, performing a method that comprises:

receiving qubit state information from a quantum system emulator,
  the quantum system emulator executing a quantum computer program, and
  the qubit state information describing one or more states of one or more respective qubits at a specified analysis point in the quantum computer program;
generating a three-dimensional graphical depiction that provides a visualization of the qubit state information; and
displaying the three-dimensional graphical depiction on a display device,
the three-dimensional graphical depiction corresponding to a depiction selected from among:
  a first display presentation that includes one or more three-dimensional representations of one or more respective Bloch spheres, associated with one or more respective qubits; and
  a second display presentation that includes a three-dimensional representation of a bar chart that conveys information regarding probability amplitudes associated with an n-qubit state,
the method providing the first display presentation and/or the second display presentation for a case in which a set of qubits under consideration are not entangled, and providing the second display presentation for the case in which the set of qubits under consideration are entangled.

* * * * *